2,957,858

AQUEOUS PHASE EMULSION POLYMERIZATION OF VINYL CHLORIDE, AND PRODUCTS PRODUCED THEREBY

Robert T. O'Donnell, Hicksville, N.Y., assignor to Rubber Corporation of America, a corporation of New York No Drawing. Filed Feb. 27, 1957, Ser. No. 642,670

6 Claims. (Cl. 260—92.8)

The present invention relates to the emulsion polymerization of vinyl chloride in the aqueous phase, and to the product resulting therefrom, which is exceptionally well suited for use in a plastisol.

Polymerized vinyl chloride in the form of a plastisol is a desirable product, largely because of the ease with which it may be stored, handled and compounded. It has previously been proposed to produce the resin content of such plastisols by emulsion polymerization, but homogenization was required and the polymerization took place in the oil phase rather than in the aqueous phase, leading to complexities in the separation of the polymer from the reacting mixture. In one emulsion polymerization process which has previously been employed, a comparatively costly homogenization step is required utilizing special equipment, the maintenance of proper reaction conditions is comparatively critical, a special heat treatment is required prior to coagulation if setback—increase in viscosity upon standing—is to be brought within acceptable limits, if a stabilizer is added even such heat treatment is relatively ineffective to limit setback, and the methods available for separating the polymer from the reaction mixture are limited and comparatively complex.

In accordance with the present invention polymerization of vinyl chloride to produce a finely divided product capable of being mixed with suitable plasticizers to form plastisols may be carried out in a simple manner, without requiring homogenization, and employing standard equipment. A wide variety of simple methods are available for separating the polymer from the reaction mixture. The particle size and paste viscosity may readily be controlled within limits. The resultant product has excellent setback characteristics, both with and without the addition of a stabilizer, and no special heat treatment is required to accomplish this end. In addition, the resultant polymers, when mixed with conventional plasticizers in conventional amounts, exhibit a high degree of electrical resistivity well above the minimum required for its characterization as an electrical grade resin and the equivalent of standard electrical grade resins produced by more conventional suspension methods. Furthermore, resin clarity is far superior to that of conventional plastisol resins.

In accordance with the present invention the vinyl chloride monomer is emulsified with water, the emulsion is appropriately catalyzed, emulsifying agents and particle-size-controlling agents are added, and polymerization is carried out at moderate temperatures and pressures. Polymerization is initiated in the aqueous phase and the resultant polymer is exceptionally stable, so that it may be separated from the reaction mixture either by direct drying or by coagulation. With a proper choice of additives the resultant polymer will contain residues derived from the additives which are in no way detrimental, and in many respects are quite beneficial, to the properties of the end product, particularly insofar as stability, paste viscosity and electrical resistivity are concerned.

A typical reaction mixture may comprise the following constituents:

Table 1

| Component: | Parts by weight |
|---|---|
| Vinyl chloride monomer | 100 |
| Water | 200 |
| Hydrogen peroxide (catalyst) | .05 |
| Sodium pyrophosphate (catalyst activator) | .4 |
| Ammonium carbonate | 2.5 |
| Stearic acid | .28 |
| Ammonium hydroxide to adjust pH to 8.0 to 10.5. | |

These components may be mixed in the reactor, in the absence of atmospheric oxygen, with no other special precautions required. The reaction mixture is then agitated moderately at an elevated temperature such as 35–45° C. and a pressure of approximately 60 to 80 lbs. per sq. inch. The reaction is permitted to continue for any desired period of time, and preferably until the reaction is complete, which may take between 12 and 36 hours.

The unreacted monomer is vented off and recovered. Several simple methods are then available for recovering the polymerized vinyl chloride. These may be characterized as drying, acid coagulation, and heavy metal salt coagulation.

*Drying.*—The resultant reaction mixture may be spray dried, or direct dried in other available ways. This is possible because of the exceptional stability of the polymer when produced as above set forth. The polymer is recovered as a powder, but agglomerated rather than finely divided. The agglomerate may be further ground in an appropriate device, such as the Micropulverizer or Microatomizer of the Pulverizing Machinery Co., a division of Metals Distintegrating Inc., to produce the end product.

*Acid coagulation.*—The reaction mixture may be coagulated by treatment with a suitable acid, such as acetic acid, followed by filtration, the filtered polymer thereafter being washed and dried.

*Heavy metal salt coagulation.*—The same procedure may be followed as with acid coagulation, except that the coagulant will be a salt of a metal which will react with the fatty acid soap in the reaction mixture to form a stabilizer for vinyl resins. Acetates and nitrates of lead, strontium, barium and cadmium are excellent for this purpose.

With the specific constituents set forth above in Table I, no deleterious residues will remain in the polymer. This is because most of those constituents are fugitive, that is to say, they will decompose and to an appreciable extent volatilize either during the reaction or during the drying step, and the residues remaining in the final product, different in composition from the original additives, will have a beneficial effect. The hydrogen peroxide catalyst will decompose to water and volatilize. The ammonium carbonate will decompose to ammonia and carbon dioxide and volatilize, largely during the drying step. Ammonium hydroxide will also decompose and volatilize. The ammonium stearate formed by a reaction between ammonium hydroxide and stearic acid will decompose when dried, leaving stearic acid. The sodium pyrophosphate will be unchanged. Thus the residues in the polymer will comprise stearic acid and sodium pyrophosphate. Stearic acid is harmless, and is frequently used as a compounding agent with vinyl resins. Moreover, its presence contributes favorably to the paste viscosity of the end product. Sodium pyrophosphate is a well recognized stabilizer for vinyl resins.

The water used in the above process should be demineralized or distilled, and should be subjected to a deaerating operation prior to use, since the presence of dissolved oxygen in the water has been found to be deleterious.

The catalyst may be any water-soluble oxygen-donating substance. Potassium persulphate, sodium persulphate, or ammonium persulphate may be used in place of hydrogen peroxide but in such case certain additional residues will be present in the polymer which may lead to a reduction in its electrical properties.

Sodium pyrophosphate is added not only because its presence in the polymer is advantageous, due to its stabilizing effect, but also because when it is present the catalyst acts much more effectively. Disodium monohydrogen phosphate has a similar effect.

The substance known as sodium pyrophosphate hydrogen peroxide may be used as a combined catalyst and catalyst activator.

The ammonium carbonate has been found to control the particle size and paste viscosity of the polymer. Many salts other than ammonium carbonate will control particle size by limiting micell formation, but most will leave undesirable residues in the polymer. It is therefore preferred that the salt used for this purpose be volatile. Sodium sulphate, ammonium sulphate, sodium chloride, potassium chloride, lead acetate, ammonium acetate, or sodium acetate, or mixtures thereof, may be used.

The ammonium stearate formed by a reaction between ammonium hydroxide and stearic acid functions as an emulsifying or wetting agent. Its effect, in a sense, counterbalances the effect of the ammonium carbonate or other particle-size controlling agent. In place of stearic acid other fatty soaps may be employed, such as lauric acid, palmitic acid or myristic acid. The ammonium fatty soap may be added directly instead of in the form of separate quantities of fatty acid and ammonium hydroxide.

The initial concentrations of the particle-size-controlling salts such as ammonium carbonate and the emulsifying agents such as ammonium stearate control the particle size chemically. Additional amounts of ammonium soaps may be added to the mix once the reaction has begun in order to have a mechanical, as distinguished from a chemical, effect in reducing the particle size. Such additions will have the further effect of stabilizing the latex during the reaction so as prevent premature coagulation. For example, several additions of stearic acid and ammonium hydroxide in the proportions set forth above may be made during the reaction. For practical purposes an upper limit of four such additions may be set. If desired, the additional amounts of ammonium soaps or the like may be added substantially continuously during part or all of the polymerization reaction.

The amount of ammonium hydroxide controls the pH of the reaction mixture, and in so doing affects the particle size and reaction rate. For higher pH values the reaction proceeds more rapidly and the molecular weight of the particle decreases.

The temperature of the reaction also affects the rate of reaction and particle size, the higher the temperature the more rapid the reaction rate and the lower the particle size.

The intensities of the effect of pH and temperature on particle size will differ, and it has been found that the highest molecular weights of the polymer particles are obtained with a high pH of approximately 9.0 and a moderate temperature of 40–41° C.

The pressure to which the mixture is subjected during the reaction will be approximately the equilibrium pressure at the reaction temperature chosen, although a somewhat higher pressure may be advantageous to eliminate the formation of scale on the walls of the reactor. Because of the deleterious effect of oxygen on the reaction, the pressure is preferably achieved by the addition of oxygen free nitrogen to the reactor.

With direct drying the stearic acid and the sodium pyrophosphate remain in the polymer. When acid coagulation is employed the washing of the filtered polymer removes the sodium pyrophosphate and the acetic acid utilized for coagulation. If it is desired to eliminate the stearic acid from the polymer, a small amount of ammonium hydroxide may be added to the wash water.

Other typical reaction mixtures are set forth in the following tables:

Table II

| Component: | Parts by weight |
| --- | --- |
| Vinyl chloride monomer | 100 |
| Water | 200 |
| Hydrogen peroxide | .05–.1 |
| Sodium pyrophosphate | .4 |
| Ammonium carbonate | 2.5 |
| Lauric acid | .33 |
| Ammonium hydroxide | .6 |

Table III

| Component: | Parts by weight |
| --- | --- |
| Vinyl chloride monomer | 100 |
| Water | 200 |
| Hydrogen peroxide | .05–.1 |
| Sodium pyrophosphate | .4 |
| Ammonium carbonate | 2.5 |
| Lauric acid | .5 |
| Ammonium hydroxide | .3 |

The resultant polymer, in the form of finely divided particles, is suitable for use in a plastisol. When the method of the present invention is employed, and through suitable choice of amounts of constituents, paste viscosities may be obtained which are as low or lower than when a separate homogenization step is employed. For example, 100 parts of polymer produced as above described, when mixed with 60 parts of a plasticizer such as dioctylphthalate and 1–2% of a stabilizer will, at room temprature, have a viscosity of 3000–8000 centipoise seconds when measured with a Brookfield viscosimeter at 20 r.p.m. Moreover, it will exhibit excellent setback properties. The plastisol above described will no more than double its viscosity after standing for two weeks.

Polymer made according to the present invention will have exceptionally good electrical properties when mixed with a plasticizer and formed into useful objects. The conventional minimum value of specific resistivity required to characterize a resin as "electrical grade," is $10^{12}$ ohms/cm.$^3$. Polymers made according to the present invention, when compounded with a plasticizer such as dioctylphthalate in proportions of 100:40, will have a specific resistivity well above, and sometimes as much as 100 to 300 times higher than, that minimum value. Moreover, immersion of the resin in water for one week will not decrease that specific resistivity by a factor greater than two.

Thus products made from a plastisol resin such as that here disclosed will have electrical and physical characteristics comparable to electrical grade suspension-type polyvinyl chloride resins such as Geon 101 (made by Goodrich Chemical Corporation), Exon 905 (made by Firestone Plastics) and Vinylite VYNW and QYNA (made by Bakelite Corporation).

The relative proportions of vinyl chloride monomer and water may be widely varied. Good results have been achieved even when the two are employed in equal amounts, or with the amount of water considerably in excess of the amount of monomer. Ranges of water in parts by weight between 88 and 400 to 100 parts by weight of resin have been found preferable. The proportions of the additives may also be widely varied depending upon the reaction conditions, particle size and paste viscosity desired or appropriate. Hydrogen peroxide may be present between .05 and .1 part by weight. The ammonium carbonate or other particle-size-controlling agents may be employed between 0.00 and 3.00 parts by weight. The stearic acid or other emulsifying fatty acid may be present between 0.1 and .65 part by weight. The ammonium hydroxide may be present between .3 and 1 part by weight. The pH should be approximately 9.0 and preferably between 8.0 and 10.5. However, all of these values may be varied within limits well known to those skilled in this field.

The following Table IV sets forth ten specifically different formulations treated according to the present invention and sets forth the measured viscosity, electrical resistivity and clarity characteristics of the resultant polymer. In each case the paste viscosity was measured on a mixture of 100 parts of the polymer with 60 parts of dioctylphthalate. The electrical resistivity was measured on press polished sheets containing 100 parts of the polymer, 40 parts of dioctylphthalate, .5 part of calcium stearate, .5 part of stearic acid and .5 part of Plumb-O-Sil B.

Table IV

| | I | II | III | IV | V | VI | VII | VIII | IX | X |
|---|---|---|---|---|---|---|---|---|---|---|
| Vi. Cl | 100 | 100 | 100 | 100 | 100 | 100 | 100 | 100 | 100 | 130 |
| H$_2$O | 200 | 210 | 210 | 210 | 200 | 200 | 200 | 200 | 200 | 115 |
| H$_2$O$_2$ | 0.21 | 0.05 | 0.05 | 0.05 | 0.05 | 0.05 | 0.05 | 0.50 | 0.50 | 0.40 |
| Na$_2$HPO$_4$ | | | | | | | | 0.50 | | |
| Na$_4$P$_2$O$_7$ | 0.40 | 0.42 | 0.42 | 0.42 | 0.40 | 0.40 | 0.40 | | | 0.56 |
| (NH$_4$)$_2$CO$_3$ | 2.00 | 2.10 | 2.10 | 2.63 | 2.50 | 2.50 | 2.50 | | | 0.78 |
| Stearic Acid | 0.285 | 0.300 | 0.300 | 0.300 | 0.285 | 0.285 | | 0.471 | 0.471 | 0.65 |
| Lauric Acid | | | | | | | 0.330 | | | |
| NH$_4$OH | 0.95 | 1.00 | 0.75 | 1.00 | 0.95 | 0.95 | 0.30 | 0.058 | 0.058 | 0.25 |
| Temperature of Polymerization, °C | 42 | 42 | 42 | 42 | 40 | 38 | 40 | 42 | 42 | 36 |
| Paste Viscosity: | | | | | | | | | | |
| Brookfield #5 Spindle—2 r.p.m., centipoise-seconds | 12,000 | 11,000 | 18,000 | 7,250 | 3,250 | 3,750 | 16,000 | above one million | | 8,000 |
| Brookfield #5 Spindle—20 r.p.m., centipoise-seconds | 42,000 | 22,000 | 22,000 | 18,000 | 7,500 | 7,500 | 34,000 | | | 12,000 |
| Electrical Resistivity, ohms/cm.$^3$ ×10$^{12}$ | 34.0 | 36.0 | 58.0 | | 250 | | | | | |
| Clarity | Good | Good | Good | Good | Good | Good | Good | Good | | Good |

It will be noted from the above chart that no reaction occurred in connection with Formula IX, which omitted the catalyst activator. The paste viscosity of Formula VIII was exceedingly high, but not so high as to make the product useless. It will be noted in this connection that the particle-size-controlling agent (ammonium carbonate) was omitted. It will further be noted that the paste viscosities and electrical resistivity values vary widely depending upon the particular selection of the relative amounts of the various components. Where no values for electrical resistivity are noted, this merely means that these measurements were not carried out.

Through the use of the present invention a polymerized vinyl chloride plastisol may be obtained in a simple and inexpensive manner, and utilizing standard equipment, which has physical and electrical characteristics quite noteworthy in a plastisol type resin and favorably comparable to non-plastisol type resins polymerized by different and more difficult and complex procedures.

While but a limited number of examples have been here set forth, it will be apparent that many variations may be made therein all within the scope of the instant invention as defined in the following claims.

I claim:

1. The method of emulsion polymerization of vinyl chloride to produce platisols in the aqueous phase which comprises emulsifying vinyl chloride monomer with water, a water-soluble oxygen-donating catalyst from the group consisting of hydrogen peroxide, potassium persulphate, sodium persulphate, ammonium persulphate, and mixtures thereof, a catalyst activator from the group consisting of sodium pyrophosphate, disodium monohydrogen phosphate, and mixtures thereof, and an emulsifying agent, comprising a member of the group consisting of ammonium stearate, ammonium laurate, ammonium palmitate, ammonium myristate, and mixtures thereof, the components being present in the following proportions:

| Component: | Parts by weight |
|---|---|
| Vinyl chloride monomer | 100 |
| Water | 88–400 |
| Catalyst | .05–.5 |
| Catalyst activator | 0.4–0.5 |
| Emulsifying agent | 0.1–0.5 | the emulsion having a pH between 8.0 and 10.5, subjecting the emulsion to heat, pressure and agitation until polymerization has taken place, and then separating the polymer therefrom.

2. The method of polymerization of vinyl chloride to produce plastisols in the aqueous phase which comprises emulsifying the following mixture:

| Component: | Parts by weight |
|---|---|
| Vinyl chloride monomer | 100 |
| Water | 88–400 |
| Oxygen donating catalyst from the group consisting of hydrogen peroxide, potassium persulphate, sodium persulphate, ammonium persulphate, and mixtures thereof | .05–.5 |
| Sodium pyrophosphate | 0.4–0.5 |
| Volatile salt | 0.78–3.00 |
| Fatty acid from the group consisting of stearic acid, lauric acid, palmitic acid, myristic acid, and mixtures thereof | 0.10–0.5 |
| Ammonium hydroxide to adjust pH to 8.0–10.5. | | subjecting the emulsion to temperatures on the order of 35–45° C. and pressures substantially corresponding to the equilibrium pressure at the selected temperature for an extended period of time, and then separating the polymer therefrom.

3. The method of polymerization of vinyl chloride to produce plastisols in the aqueous phase which comprises emulsifying the following mixture:

| Component: | Parts by weight |
|---|---|
| Vinyl chloride monomer | 100 |
| Deaerated water | 88–400 |
| Oxygen donating catalyst from the group consisting of hydrogen peroxide, potassium persulphate, sodium persulphate, ammonium persulphate, and mixtures thereof | 0.05–0.50 |
| Sodium pyrophosphate | 0.4–0.5 |
| Volatile salt | 0.78–3.00 |
| Fatty acid from the group consisting of stearic acid, lauric acid, palmitic acid, myristic acid, and mixtures thereof | 0.10–.5 |
| Ammonium hydroxide to adjust pH to 8.0–10.5. | | subjecting the emulsion to temperatures on the order of 35–45° C. and pressures substantially corresponding to the equilibrium pressure at the selected temperature in an oxygen-free atmosphere 12–36 hours; and then separating the polymer therefrom.

4. The method of polymerization of vinyl chloride to produce plastisols in the aqueous phase which comprises emulsifying the following mixture:

| Component: | Parts by weight |
|---|---|
| Vinyl chloride monomer | 100 |
| Water | 88–400 |
| Hydrogen peroxide | 0.05–0.50 |
| Sodium pyrophosphate | App. 0.4 |
| Ammonium carbonate | 0.78–3.00 |
| Stearic acid | 0.10–0.50 |
| Ammonium hydroxide to adjust pH to 8.5–10.5. | | subjecting the emulsion to temperatures on the order of 35–45° C. and pressures substantially corresponding to the equilibrium pressure at the selected temperature for an extended period of time, and then separating the polymer therefrom.

5. The method of polymerization of vinyl chloride to produce plastisols in the aqueous phase which comprises emulsifying the following mixture:

| Component: | Parts by weight |
|---|---|
| Vinyl chloride monomer | 100 |
| Water | 88–400 |
| Hydrogen peroxide | 0.05–0.1 |
| Sodium pyrophosphate | App. 0.4–0.50 |
| Ammonium carbonate | 0.78–3.00 |
| Lauric acid | 0.10 to 0.50 |
| Ammonium hydroxide to adjust pH to 8.0–10.5. | | subjecting the emulsion to temperatures on the order of 35–45° C. and pressures substantially corresponding to the equilibrium pressure at the selected temperature for an extended period of time; and then separating the polymer therefrom.

6. The method of claim 1, in which said emulsion also comprises a particle-size-controlling agent present in an amount up to 3 parts by weight and selected from the group consisting of ammonium carbonate, sodium sulphate, ammonium sulphate, sodium chloride, potassium chloride, lead acetate, ammonium acetate, sodium acetate, and mixtures thereof.

References Cited in the file of this patent

UNITED STATES PATENTS

| | | |
|---|---|---|
| 2,068,424 | Mark et al. | Jan. 19, 1937 |
| 2,364,227 | Lewis et al. | Dec. 5, 1944 |
| 2,377,752 | Britton et al. | June 5, 1945 |
| 2,829,134 | Coene | April 1, 1958 |